Figure 1:
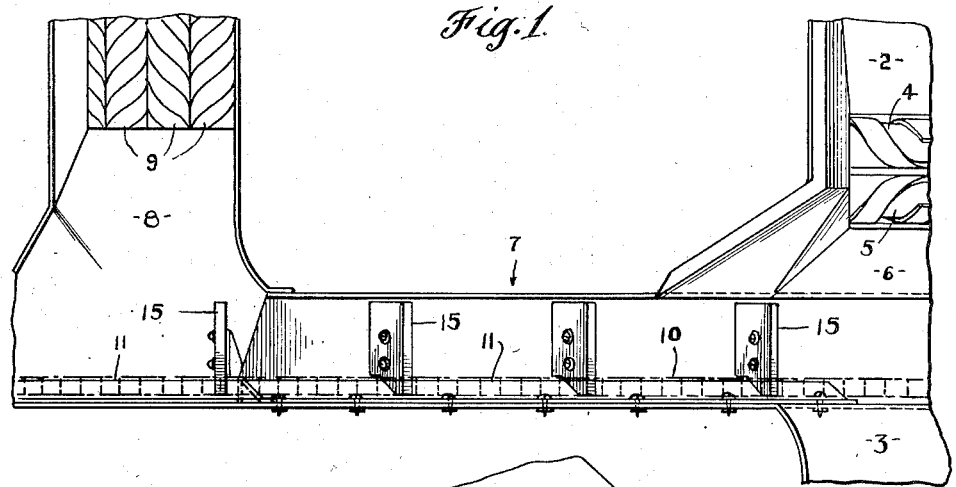

May 21, 1957 — W. G. SEARLES — 2,792,937
CONVEYING MECHANISM
Filed Nov. 2, 1953 — 2 Sheets-Sheet 1

INVENTOR
William G. Searles
By Richard E. Babcock Jr.
ATTORNEY

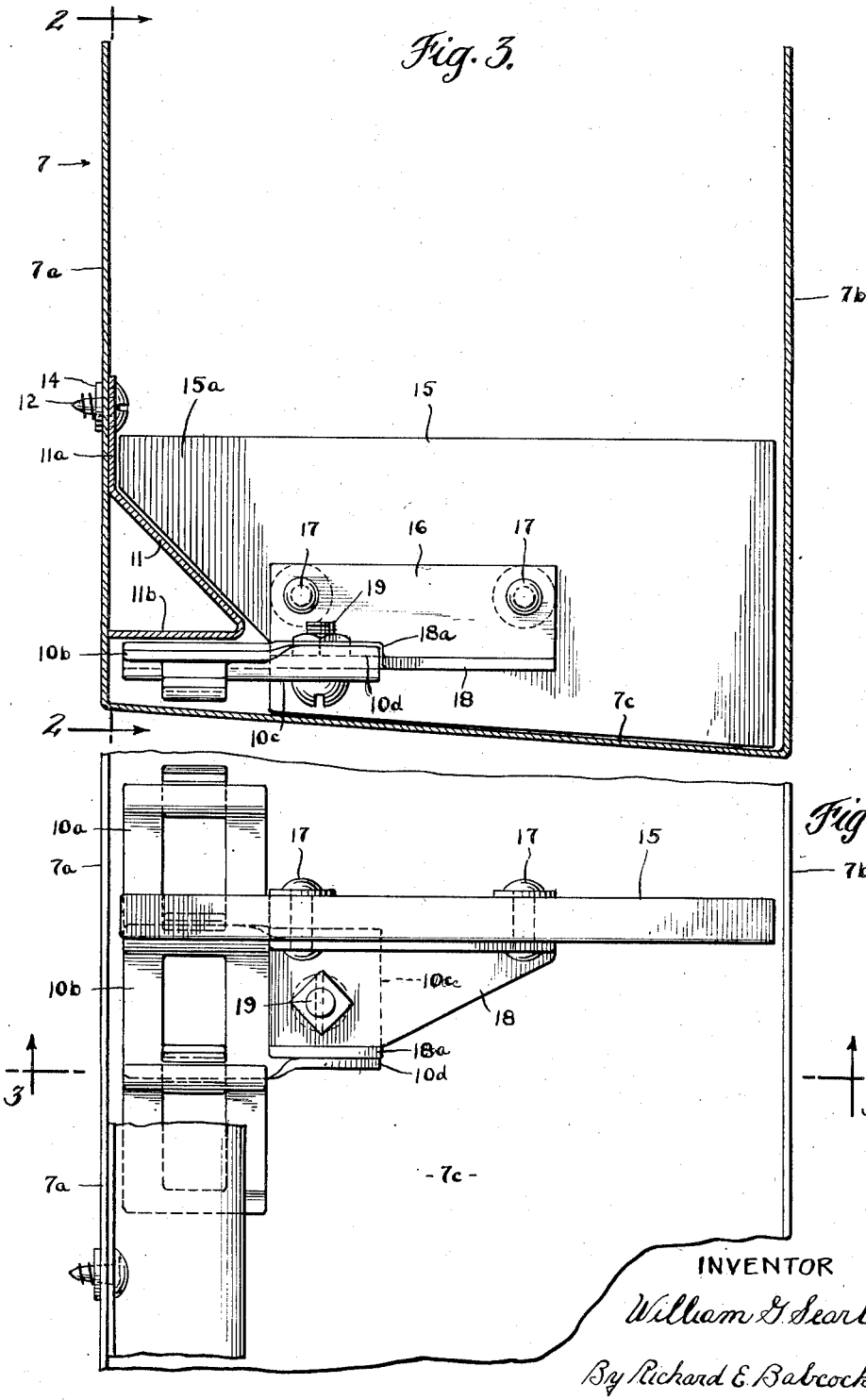

United States Patent Office 2,792,937
Patented May 21, 1957

2,792,937

CONVEYING MECHANISM

William G. Searles, Ephrata, Pa., assignor, by mesne assignments, to Sperry Rand Corporation, New Holland, Pa., a corporation of Delaware Application November 2, 1953, Serial No. 389,703

7 Claims. (Cl. 209—72)

This invention relates to a material conveying and separating means which finds particular utility in a corn harvester for conveying ears of corn from the snapping rolls to the husking rolls and for separating fragments of stalks and trash from the ears of corn.

However, the invention is by no means limited to this particular application, but may obviously be adapted for other uses.

In certain conventional types of corn harvesting machines the ears of corn, after being removed from the stalks by the usual snapping rolls, are delivered to a conveyor which takes them to a set of husking rolls which remove the husks in conventional manner. The conveyor is generally in the form of a sloping trough through which moves one run of a flexible chain or other element having spaced conveyor flights attached thereto to receive between them the ears of corn and to propel these ears through the trough to a discharge point for delivery onto the husking rolls. The pieces of stalk and trash too long to fit between adjoining conveyor flights are supported on the flights and carried thereby past the discharge point to a separate point of discharge at the end of the run of the conveyor chain.

In such conveyors it has not been uncommon for ears of corn to be lost occasionally due to lodging on the flexible conveyor element and being carried thereby past their intended point of discharge and discharged at the end of the conveyor run together with the stalk fragments and trash.

It is a primary object of the invention, therefore, to eliminate this difficulty in a simple, practical, and efficient manner by disposing the flexible conveyor element for movement closely adjacent one side of the trough and by mounting on said side of the trough a deflector which includes a deflecting surface overlying the flexible element and sloping transversely downwardly away from the said trough side to thus deflect the ears of corn or other conveyed objects transversely to one side of the conveyor element.

It is also an important object to prevent conveyed objects from lodging between the conveyor flights and the sloping deflector surface and thus being carried beyond their intended point of discharge. To this end the conveyor flights are carried by the conveyor element in laterally offset manner at one side of the deflector and are provided with overhanging portions or lateral extensions overlying the deflector in substantially contiguous sweeping relation thereto to prevent objects from wedging between the conveyor flights and deflector and to propel therealong any objects which may be crowded onto the deflector.

It is a still further object of the invention to provide such a construction which may utilize commercially available link belts or chains to form the flexible conveyor element and which permit replacement of damaged conveyor flights without removing or disturbing the deflector or any of the chain links. To this end the supporting brackets of the respective conveyor flights are detachably connected to the laterally projecting attaching wings of conventional attaching links at easily accessible points located to one side of the overhanging deflector.

Figure 2:
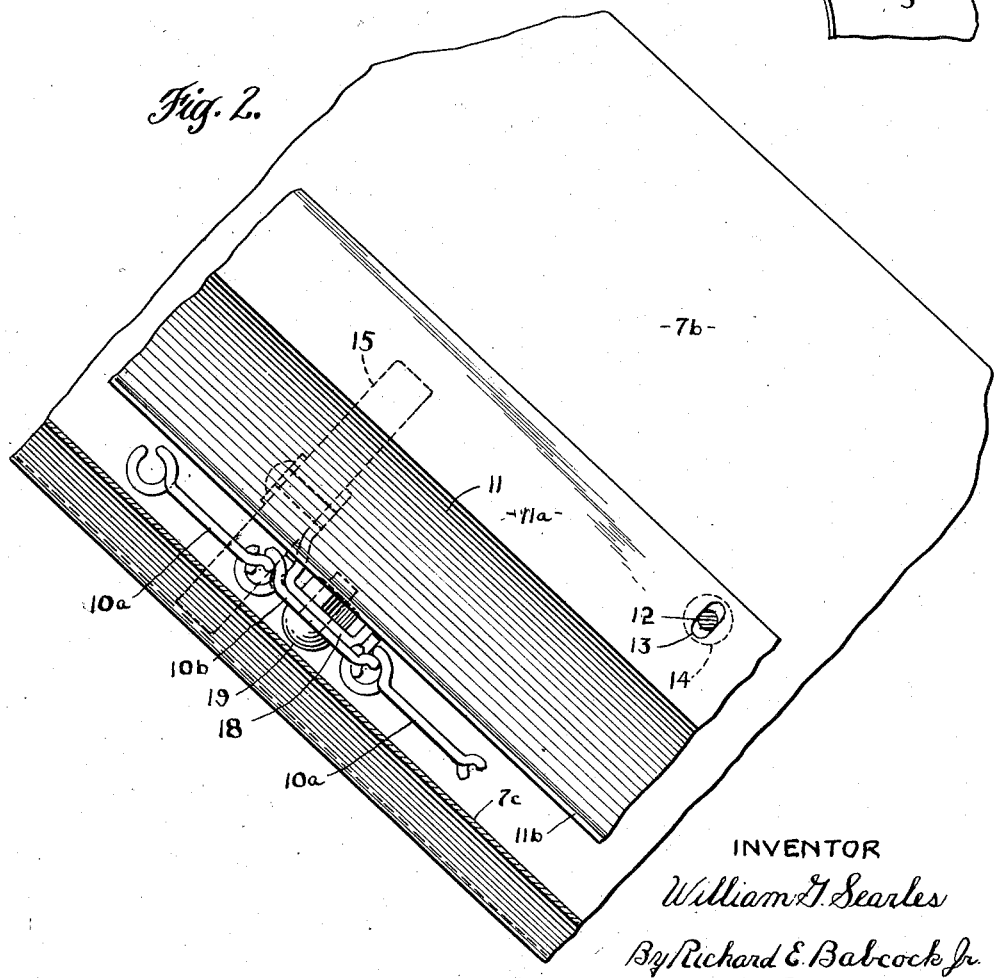

The foregoing, as well as other incidental objects and advantages, are attained by the preferred embodiment of the invention illustrated in the accompanying drawings in which:

Figure 1 represents a fragmentary plan view of a conventional corn haresting machine employing the conveyor of the invention to move the ears of corn from the snapping rolls to the husking bed and to separate the elongated stalk fragments and trash from the ears of corn;

Figure 2, a relatively enlarged section on the line 2—2 of Figure 3 looking in the direction of the arrows;

Figure 3, a section on the line 3—3 of Figure 4, on a similarly enlarged scale; and Figure 4, an enlarged fragmentary plan view of the conveyor mechanism of the invention.

Referring now in detail to the accompanying drawings, I have illustrated in Figure 1 a partial showing of a more or less conventional corn harvesting machine having the conveyor of the invention incorporated therein. The machine comprises a pair of conventional gathering elements 2 and 3 which respectively rotatably support the opposed snapping rolls 4 and 5 arranged and constructed in conventional manner, the rear end of roll 4 being somewheat higher than roll 5 whereby the ears of corn, after being snapped, may be discharged from these rolls into a sloping discharge chute 6 which delivers them by gravity into the lower end of the trough 7 constituting part of the conveyor or conveying mechanism of the invention.

The trough 7 slopes upwardly from its receiving end adjacent to rolls 4 and 5 to its discharge end which is located above and communicates with a discharge trough or chute 8 which delivers the discharged ears of corn by gravity onto the husking rolls 9 of a usual husking bed. Obviously, the upper end or terminus of the trough 7 defines the discharge point for the ears of corn.

As is best illustrated in Figures 3 and 4, the trough 7 comprises a conventional sheet metal construction embodying a pair of laterally opposed vertical sides 7a and 7b and a bottom 7c.

Moving longitudinally through the trough 7 over the bottom 7c thereof closely adjacent to one of the side walls 7a is a run or portion of a usual flexible conveyor element which in the present embodiment assumes the form of an endless conveyor chain 10. This chain is formed of conventional pivotally interconnected links 10a having interposed therein preferably at uniform intervals attaching links 10b, each of which is provided with an integral attaching portion 10c projecting laterally therefrom on the side remote from the trough side wall 7a.

A shield or deflector essentially comprising an upwardly presented inclined surface 11 is supported on side wall 7a above the chain or element 10. It will be noted that the upwardly presented surface of the deflector 11 slopes downwardly from the side wall 7a transversely of the trough 7 to deflect material toward the center of the trough and thus to one side of the chain or element 10.

In the preferred embodiment the deflector 11 is provided with an integral vertical attaching flange 11a which is secured flush against the inner face of the trough side wall 7a by means of the sheet metal screws 12 disposed through vertical slots 13 in side wall 7a and threaded into sheet metal nut members 14, all as best illustrated in Figures 2 and 3 of the drawings. By virtue of this arrangement the deflector 11 may be adjusted toward or away from the chain 10 to permit proper clearance between these parts. Preferably deflector 11 is provided with a reversely inwardly turned horizontal portion 11b (see Figure 3) which is operatively disposed in edgewise abutment with the trough side wall 7a to provide a lateral reinforcement for deflector 11 and also to prevent trash or debris from accumulating between the chain 10 and the under face of deflector 11.

If desired, the deflector 11 may be formed in separate longitudinally aligned sections, as shown in Figure 1.

In this arrangement it will be seen that the flight attaching portions 10c of the attaching links 10b project laterally from beneath the deflector 11 toward the medial transverse portion of the trough 7. Each of these portions 10c provides supporting means for a conveyor flight 15 preferably of a suitable rubber impregnated and bonded laminated fabric construction. Each such conveyor flight 15 includes suitable provision for securing it to the flight supporting portion 10c of its associated attached link 10b. In the preferred embodiment of the invention such provision is made by means of suitable metal angle brackets 16, each having its respective conveyor flight 15 securely riveted against the forwardly presented face thereof as at 17 and having a relatively angularly disposed supporting base 18 secured flush against the attaching portion 10c as by means of a bolt 19. It will be noted that the bolt 19 is located in a readily accessible position to one side and clear of the deflector 11 so that the brackets 16 of the respective conveyor flights 15 may be easily removed from or secured to the attaching portions of their respective attaching links 10b without the necessity of removing the associated attaching links 10b or of disturbing the deflector 11. Inasmuch as the metal flight supporting brackets 16 may occasionally be bent or otherwise damaged from time to time sufficiently to require their replacement, the importance of this feature will be readily recognized.

It is desirable to employ but a single connecting bolt 19 in securing the flight supporting brackets 16 to the respective links 10b in order to promote both the ease and rapidity of replacing the conveyor flights. In order to prevent swivelling of the brackets 16 about their respective bolts 19 as thus employed, both the supporting base 18 of each bracket 16 and the attaching portion 10c of its associated chain link may be provided with normally abutting upwardly turned edge flanges 18a and 10d respectively. These extend in planes generally parallel to the axis of the bolt 19 and on either side of its axis to thus prevent swinging of the brackets 16 about said bolts 19 in either direction, as will be readily apparent.

In order that ears of corn may not lodge on the deflector 11 and become wedged between it and the conveyor flights 15 to be thus carried along over and beyond the intended point of discharge over the chute 8, each of said flights 15 is provided with an overhanging lateral wing or extension 15a, best shown in Figure 3, which rides over the deflector 11 with its lower edge substantially parallel and contiguous to the deflector 11. Also it will be noted that the end of this wing 15a of each flight 15 in the preferred embodiment extends parallel and in substantially contiguous sweeping relation to the vertical attaching flange 11a of the deflector 11. Thus it is impossible for conveyed material other than quite minute fragments to work between the conveyor flights 15 and the deflector 11.

The operative run of the conveyor element or chain 10 moves over and beyond the discharge trough 8 before commencing its return movement, so that in accordance with usual practice stalks or fragments thereof and other trash of too great length to fit between adjoining conveyor flights 15 will span and be supported across the upper edges of adjoining flights 15 to be carried thereby beyond the discharge point or end of the trough 7 completely across the discharge chute 8 to a suitable discharge point on the side of said chute remote from trough 7. Thus there is effected a separation of the stalk fragments and trash from the ears of corn which are delivered into the chute 8.

In order to decrease the possibility of ears of corn being crowded onto the deflector 11 and being propelled across the discharge chute 8 for discharge with the trash, it is desirable to incline the bottom 7c of the trough 7 downwardly slightly as shown in Figure 3 so that it slopes downwardly away from the deflector 11.

Thus in the operation of the invention as above described, it will be seen that incoming ears of corn received from the snapping rolls 4 and 5 through the chute 6 will drop between adjoining conveyor flights 15 in the trough 7 and will be propelled along the trough by these flights until they reach its uppermost or discharge end. Upon reaching this discharge point they will drop from between the flights 15 into the chute 8 which delivers them to the husking rolls 9 to be acted upon in usual manner.

It will be seen that upon being received in the trough 7 the ears of corn will be deflected to the bottom of the trough to one side of the chain 10 and hence clear thereof by the action of deflector 11 so that none of these ears of corn can lodge on the chain 10 and be carried by it across the discharge chute 8.

The overhanging lateral extensions 15a of the conveyor flights which move over the deflector 11 in sweeping contiguous relation thereto will prevent the ears of corn from lodging between the conveyor flights and the deflector 11 to be carried along beyond the intended point of discharge. And, of course, crowding of ears of corn onto the deflector 11 in such manner as to permit the possibility of their riding across the discharge chute 8 on deflector 11 beyond their intended discharge point is discouraged in the preferred embodiment by the action of the inclined or sloping bottom 7c of the trough 7.

Stalk fragments or elongated trash particles of a size too great to permit reception between adjoining conveyor flights 15 are supported across the upper edges of adjoining flights 15 and carried thereby across and above the chute 8 for discharge rearwardly thereof.

In the event any of the flight supporting brackets 16 become functionally impaired due to bending or other damage, these and their associated flight members 15 may be readily replaced as units without disturbing either the deflector 11 or conveyor chain 10 in any manner, it being necessary only to unfasten the bolt 19 which secures the damaged bracket 16 in place, replace the damaged bracket and associated flight member 15 and secure same in position by replacing the bolt 19.

In this application I have shown and described only the preferred embodiment of the invention simply by way of setting forth the preferred mode contemplated by me of carrying out my invention. However, I recognize that the invention is capable of various modifications and that the several details of the invention may be altered in various ways without departing from the scope of the appended claims.

Having thus described the invention, I claim:

1. Conveying means comprising a trough having a bottom and opposed side walls, a flexible conveyor element moveable through said trough adjacent one only of said side walls, a discharge chute communicating with said trough on the side thereof remote from said one side wall, a stationary deflector secured to said one side wall and having a deflecting surface slanting downwardly from said one side wall, said deflector extending beyond said discharge chute, and a plurality of spaced conveyor flights carried on said flexible conveyor element and having portions overlying said deflector, said conveyor flights being moveable relative to the deflector and adapted to push articles of a length less than the space between adjacent flights through said trough and over said deflector, said articles upon reaching said discharge chute being discharged laterally by gravity into said chute.

2. Conveying means as recited in claim 1 wherein said trough bottom wall slopes downwardly from said one side wall to the remote side wall and said plurality of spaced conveyor flights have lower edges which extend parallel to said bottom wall.

3. Conveying means as recited in claim 1 wherein said deflector has a base portion inturned from said deflecting surface, said base portion extending above said flexible conveyor generally perpendicular to said one side wall and preventing articles conveyed through said trough from lodging under said deflecting surface.

4. Conveying means as recited in claim 3 wherein means is provided for vertically adjusting said deflector whereby the space between said base portion of said deflector and said flexible conveyor may be varied.

5. Conveying means as recited in claim 1 wherein each conveyor flight is connected to said flexible conveyor element by a single, removeable, vertically extending, connecting member, and means is provided for preventing each flight from swivelling about its associated connecting member.

6. Conveying means as recited in claim 1 wherein the portions of the conveyor flights overlying said deflector have lower edges extending generally parallel to the slanting deflecting surface of the deflector, and said conveyor flights are made of a flexible material.

7. Conveying means as recited in claim 2 wherein the plurality of spaced conveyor flights have upper edges which extend horizontally and below the top edges of said opposed side walls of said trough, said upper edges being adapted to jointly support and convey articles which are of a length greater than the space between said flights through said trough and past said discharge chute.

References Cited in the file of this patent

UNITED STATES PATENTS

| | | |
|---|---|---|
| 1,290,200 | Holmested | Jan. 7, 1919 |
| 1,595,566 | Newdick | Aug. 10, 1926 |
| 1,821,438 | Levin | Sept. 1, 1931 |
| 1,902,873 | Marone | Mar. 28, 1933 |
| 2,096,409 | Sayers | Oct. 19, 1937 |
| 2,290,950 | Duncan | July 28, 1942 |
| 2,368,353 | Fulper | Jan. 30, 1945 |
| 2,630,207 | Joy | Mar. 3, 1953 |

FOREIGN PATENTS

| | | |
|---|---|---|
| 629,844 | Germany | May 14, 1936 |
| 672,956 | Germany | Mar. 17, 1939 |